United States Patent
Chidambarrao et al.

(10) Patent No.: US 12,218,120 B2
(45) Date of Patent: Feb. 4, 2025

(54) DEVICE MISMATCH MITIGATION FOR MEDIUM RANGE AND BEYOND DISTANCES

(71) Applicant: International Business Machines Corporation, Armonk, NY (US)

(72) Inventors: Dureseti Chidambarrao, Weston, CT (US); Matthew Stephen Angyal, Stormville, NY (US); Noah Zamdmer, Sleepy Hollow, NY (US); Varadarajan Vidya, Sudbury, MA (US); James Strom, Rochester, MN (US); Grant P. Kesselring, Rochester, MN (US); Erik Unterborn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 17/354,469

(22) Filed: Jun. 22, 2021

(65) Prior Publication Data

US 2022/0406769 A1  Dec. 22, 2022

(51) Int. Cl.
*H01L 27/02* (2006.01)
*G06F 30/392* (2020.01)

(52) U.S. Cl.
CPC ........ *H01L 27/0207* (2013.01); *G06F 30/392* (2020.01)

(58) Field of Classification Search
CPC ... H01L 27/0207; G06F 30/392; G06F 30/398
See application file for complete search history.

(56) References Cited

U.S. PATENT DOCUMENTS

| | | | |
|---|---|---|---|
| 6,609,235 B2 | 8/2003 | Ramaswamy et al. | |
| 7,888,736 B2 | 2/2011 | Anderson et al. | |
| 8,001,512 B1 * | 8/2011 | White | G06F 30/39 716/55 |
| 8,978,000 B2 | 3/2015 | Huang et al. | |
| 9,092,586 B1 | 7/2015 | Ginetti et al. | |
| 9,287,252 B2 | 3/2016 | Chen et al. | |
| 9,378,314 B2 | 6/2016 | Kundu et al. | |
| 9,953,123 B2 | 4/2018 | Somashekar et al. | |
| 10,153,265 B1 | 12/2018 | Chu et al. | |
| 2007/0170546 A1 * | 7/2007 | Beach | H01L 28/60 257/535 |

(Continued)

*Primary Examiner* — Mounir S Amer
*Assistant Examiner* — Alexander Belousov
(74) *Attorney, Agent, or Firm* — Scully, Scott, Murphy & Presser, P.C.; L. Jeffrey Kelly, Esq.

(57) ABSTRACT

A structure is provided that includes a first active circuit in which at least one of areas surrounding the first active circuit includes an active circuit-containing region. A second active circuit is spaced apart from the first active circuit. The second active circuit includes a circuit mimic fill area present in at least one of the areas surrounding the second active circuit. The circuit mimic fill area substantially matches the active circuit-containing region that is adjacent to the first active circuit. The circuit mimic fill area is located on an equivalent side of the second active circuit as the active circuit-containing region that is present adjacent the first active circuit. The use of the circuit mimic fill mitigates the effects over medium range and beyond distances that cause device failure.

12 Claims, 1 Drawing Sheet

(56) References Cited

U.S. PATENT DOCUMENTS

| | | | |
|---|---|---|---|
| 2008/0203540 A1* | 8/2008 | Anderson | H01L 27/0207 257/E21.24 |
| 2009/0096066 A1* | 4/2009 | Anderson | H01L 23/544 257/629 |
| 2015/0179627 A1* | 6/2015 | Huang | H01L 27/11803 257/202 |
| 2018/0365450 A1* | 12/2018 | Cheng | G06F 21/76 |

* cited by examiner

DEVICE MISMATCH MITIGATION FOR MEDIUM RANGE AND BEYOND DISTANCES

BACKGROUND

The present application relates to semiconductor technology, and more particularly to a structure including a pair of neighboring circuits having circuit layouts in which device matching is needed over distances beyond 0.5 micron (such distances are referred to herein as 'medium range and beyond distances'). The present application also provides a method of mitigating device mismatch between a pair of neighboring circuits over medium range and beyond distances.

An electronic circuit (herein referred to as merely a "circuit") is composed of individual electronic components, such as resistors, transistors, capacitors, inductors and diodes, connected by conductive wires or traces through which electric current can flow. To be referred to as electronic, rather than electrical, generally at least one active component must be present. The combination of components and wires allows various simple and complex operations to be performed: signals can be amplified, computations can be performed, and data can be moved from one place to another. Typically, a plurality of circuits is integrated on a same substrate.

An integrated circuit (IC) layout (herein referred to as merely a "layout") is the representation of an integrated electronic circuit using planar geometric shapes that correspond to the patterns of metal oxide, or semiconductor layers that make up the components of the integrated circuit on the same substrate.

There are many circuits that have a need for matched devices, particularly analog circuits. Circuits like phase locked loops (PLLs) or digital thermal sensors (DTSs) are sensitive to mismatch of PFET to PFET, NFET to NFET, and PFET to NFET due to threshold, currents, or other, anomalies in the FETs; herein TET' refers to a field effect transistor.

Structures and methods to account for local mismatch differences between devices are known. When mismatch differences occur within a 0.5 micron layout range they are considered local. If two devices that need matching do not have layout surrounds in all directions to within a range of 0.5 micron that are identical, it is possible that the two device threshold voltages, or other device characteristics, will not match well. However, even with identically matched local layouts within the 0.5 micron range, the two devices may not match. In many cases, layout matching needs to extend to a range of 1000 microns. Efficient solutions to mitigate effects over a medium or beyond layout range (i.e., beyond 0.5 micron) are not presently available. There is thus a need for a structure and method to mitigate the effects of mismatched devices over a distance beyond 0.5 micron of their surrounds.

SUMMARY

A structure and method are provided to obtain better matching between devices across medium range and beyond distances (i.e., beyond the 0.5 micron range). Notably, the structure includes a first active circuit in which at least one of areas surrounding the first active circuit includes an active circuit-containing region. A second active circuit is spaced apart from the first active circuit. The second active circuit includes a circuit mimic fill area present in at least one of the areas surrounding the second active circuit. The circuit mimic fill area substantially matches the active circuit-containing region that is adjacent to the first active circuit. The circuit mimic fill area is located on an equivalent side of the second active circuit as the active circuit-containing region that is present adjacent the first active circuit. The use of the circuit mimic fill mitigates the medium range and long range effects that cause device failure.

In one aspect of the present application, a structure is provided. In one embodiment, the structure includes a first active circuit having an east side, a west side, a north side and a south side, wherein a first area is located adjacent to the east side of the first active circuit, a second area is located adjacent to the west side of the first active circuit, a third area is located adjacent to the north side of the first active circuit and a fourth area is located adjacent to the south side of the first active circuit, and wherein at least one of the first area, the second area, the third area and the fourth area comprises an active circuit-containing region containing another active circuit. The structure further includes a second active circuit spaced apart from the first active circuit and containing a device that needs matching to a device of the first active circuit, the second active circuit has an east side, a west side, a north side and a south side, wherein a fifth area is located adjacent to the east side of the second active circuit, a sixth area is located adjacent to the west side of the second active circuit, a seventh area is located adjacent to the north side of the second active circuit and an eighth area is located adjacent to the south side of the second active circuit, wherein at least one of the fifth area, the sixth area, the seventh area and the eighth area comprises a circuit mimic fill area that substantially matches the active circuit-containing region that is adjacent to the first active circuit, and wherein the circuit mimic fill area is located on an equivalent side of the second active circuit as the active circuit-containing region that is present adjacent the first active circuit.

In another aspect of the present application, a method (i.e., methodology) for mitigating device mismatching over medium range and beyond distances is provided. In one embodiment, the method includes providing a structure comprising spaced apart first and second active circuits. The first active circuit has an east side, a west side, a north side and a south side, wherein a first area is located adjacent to the east side of the first active circuit, a second area is located adjacent to the west side of the first active circuit, a third area is located adjacent to the north side of the first active circuit and a fourth area is located adjacent to the south side of the first active circuit, and wherein at least one of the first area, the second area, the third area and the fourth area comprises an active circuit-containing region containing another active circuit. The second active circuit contains a device that needs matching to a device of the first active circuit and has an east side, a west side, a north side and a south side, wherein a fifth area is located adjacent to the east side of the second active circuit, a sixth area is located adjacent to the west side of the second active circuit, a seventh area is located adjacent to the north side of the second active circuit and an eighth area is located adjacent to the south side of the second active circuit. Next, the first active circuit is evaluated to determine which side, or sides, of the first active circuit contains the active circuit-containing region, and thereafter the areas surrounding the second active circuit and on the side, or sides, of the second active circuit that are equivalent to the side, or sides containing the active circuit-containing region are replaced with a circuit mimic fill area. The circuit mimic fill area substantially matches the active circuit containing region that is adjacent to the first active circuit, and is placed on an equivalent side of the second active circuit as the active circuit-containing region that is present adjacent the first active circuit.

DETAILED DESCRIPTION

Figure 1:
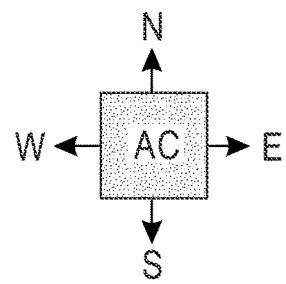
FIG. 1 is an illustration showing the orientation of an active circuit as used in the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

While circuit simulations predicted a particular PLL design was robust, in early hardware an unacceptable yield loss was seen attributed to the PLLs. Using nanoprobing to determine device parameters, Applicant determined that FET mismatch between devices that needed matching was the cause of the yield loss. In some instances, the local layout (within a surround 0.5 micron radius) around each of the device pairs that needed matching was different. In other instances, it was also shown that devices in identical layout footprints to a radius of 0.5 micron did not match. These observations required the Applicant to minimize layout driven mismatch across medium range and beyond distances (i.e., beyond a 0.5 micron distance).

The present application discloses a structure and method to obtain better matching between mismatched devices across medium range and beyond distances. The present application uses a circuit mimic fill to mitigate effects beyond a 0.5 micron distance (i.e., medium range and long range).

Prior to describing the structure and method of the present application, definitions of key terms used throughout the present application are first provided.

Throughout the present application, an active circuit is defined as a circuit that includes electronic components, such as resistors, transistors, capacitors, inductors and/or diodes, connected by a conductive wire or trace through which electric current can flow. The active circuits that can be used in the present invention include analog circuits, digital circuits, mixed-signal circuits (a combination of analog circuits and digital circuits), or any combination thereof. The active circuits are present on a same substrate (or board). In some embodiments, the active circuits include PFETs and/or NFETs. The circuits can include PLLs and/or DTSs.

Throughout the present application, a layout is defined as the representation of an integrated electronic circuit using planar geometric shapes that correspond to the patterns of metal oxide, or semiconductor layers that make up the components of the integrated circuit on the same substrate.

Throughout the present application, an active circuit-containing region denotes an area that is adjacent to at least one side of one of the active circuits of a pair of active circuits that needs device matching. The active circuit-containing region contains another active circuit, and it is connected to metal wiring.

The active circuits that are employed in the present application include materials and components that are well known to those skilled in the art. The active circuits that are employed in the present application can be formed utilizing processing techniques that are also well known to those skilled in the art. So as not to obscure the gist of the present application, details concerning the materials, components and processing techniques used in forming the active circuits are not provided herein.

Throughout the present application, the term "dummy region" denotes a common fill area that does not mimic an active circuit in any way. The dummy region is not connected to any metal wires thus the dummy region is a non-active area. Exemplary common fill materials and layouts that can provide the dummy region include, but are not limited to, active regions, shallow trench and other isolation regions, contacts, gate regions, and other front end of the line layout regions. The dummy region(s) can be formed utilizing techniques well known to those skilled in the art.

Throughout the present application, the term "circuit mimic fill area" denotes a fill area that substantially, or even completely, matches the active circuit-containing region that is present in a circuit layout of one of the active circuits of a pair of active circuits that needs device matching. By "substantially matches" it is meant that the circuit mimic fill area is at least 90% identical to the active circuit-containing region that is present adjacent to a first active circuit of a pair of active circuits that needs device matching. In some embodiments, the circuit mimic fill area is from 91-99% (including any of the integers within this range, i.e., 92%, 93%, . . . etc.) identical to the active circuit-containing region that is present adjacent to a first active circuit of a pair of active circuits that needs device matching. In other embodiments, the circuit mimic fill area completely matches the active circuit containing region.

In accordance with the present application, the circuit mimic fill area is located on an equivalent side of a second active circuit of the pair of active circuits that needs device matching as the active circuit-containing region that is present adjacent the first active circuit of the pair of active circuits. The presence of the circuit mimic fill area adjacent the second active circuit of the pair of active circuits helps to mitigate the device mismatch problem observed for 0.5 micron and beyond distances.

The circuit mimic fill area is not connected to any metal wires thus the circuit mimic fill area is a non-active area. In some embodiments, the circuit mimic fill area contains a previously active circuit in which metal wiring has been removed therefrom. In other embodiments, the circuit mimic fill area is a fill area that entirely replaces another area located on one of the sides of an active circuit.

Throughout the present application, the term "device mismatching" denotes that a device of a second active circuit of a pair of active circuits has a device parameter that does not match an equivalent device parameter of a device of a first active circuit. In the present application, the mismatching device parameters can include, but are not limited to, different threshold voltages, currents, or other device characteristics. The devices that need matching include, for example, PFETS and/or NFETS.

Referring now to FIG. 1, there is shown the orientation of an active circuit AC as used in the present application. As shown, the active circuit AC includes four sides: an east side, a west side, a north side and a south side; the east (E), west (W), north (N) and south (S) directions are clearly depicted in FIG. 1 by the arrows that are present in the drawing. An area (or quadrant) is present on each side of the active circuit AC. For example, a first area is present adjacent the east side of the active circuit AC, a second area is present adjacent the west side of the active circuit AC, a third area is present adjacent the north side of the active circuit AC, and a fourth area is present adjacent the south side of the active circuit AC. The areas that are adjacent to the various sides of the active circuit can be an active circuit-containing region that includes another active circuit, and/or a dummy region. Collectively, the first area, the second area, the third area and fourth area that are located adjacent to the active circuit AC define a 'local' circuit layout of the active circuit AC.

In the present application, a structure including a pair of neighboring active circuits having circuit layouts in which device matching is needed is initially used. Notably and referring to FIG. 2, a first active circuit AC1 having a first circuit layout surrounding the first active circuit AC1 and a second active circuit AC2 having a second circuit layout surrounding the second active circuit AC2 are present on a common substrate or mother board 10. It is noted that other active circuits (not shown) having their own circuit layouts can be present laterally adjacent to the area located on the west side of the first active circuit AC1, laterally adjacent to the area on the east side of the second active circuit AC2, laterally adjacent to the area on the north side of the both the first and second active circuits AC1, AC2 and/or laterally adjacent to the area on the south side of the both the first and second active circuits AC1, AC2. Each of the first active circuit AC1 and the second active circuit AC2 has a cell size of 0.5 micron or greater up to, and including, 1000 microns.

Figure 2:
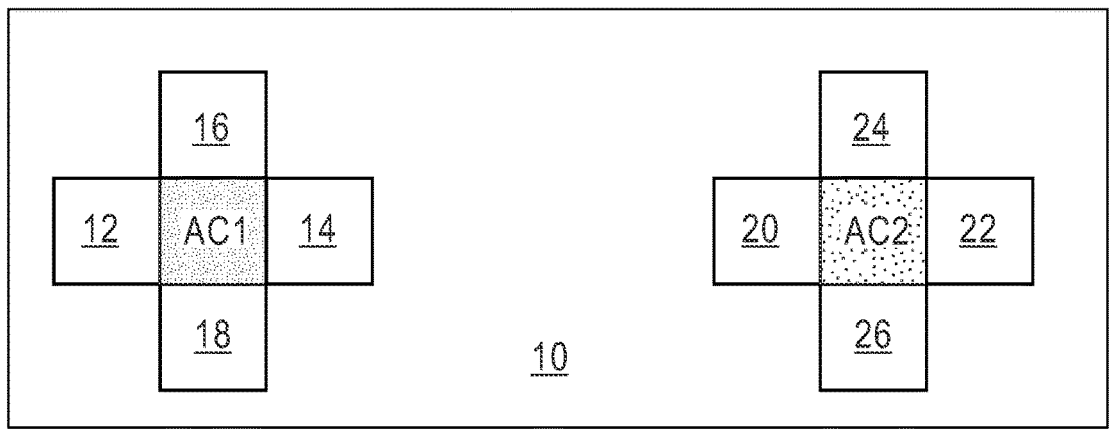
FIG. 2 is a top-down view of an exemplary initial structure containing two active circuits in which device matching is required.

As is shown in FIG. 2, the second active circuit AC2 is spaced apart from the first active circuit AC1 and thus it is not present in the 'local' circuit layout of the first active circuit AC1. In the present application, the first and second layouts can be the same or different from each other. In accordance with the present application, the pair of spaced apart active circuits AC1, AC2 includes devices, for examples, transistors (NFETs and/or PFETs), that could have mismatched device parameters, as defined above.

As is further shown in FIG. 2, a first area 12 is located adjacent to the west side of the first active circuit AC, a second area 14 is located adjacent to the east side of the first active circuit AC1, a third area 16 is located adjacent to the north side of the first active circuit AC1, and a fourth area 18 is located adjacent to the south side of the first active circuit AC1, while a fifth area 20 is located adjacent to the west side of the second active circuit AC2, a sixth area 22 is located adjacent to the east side of the second active circuit AC2, a seventh area 24 is located adjacent to the north side of the second active circuit AC2, and an eighth area 26 is located adjacent to the south side of the second active circuit AC.

It is noted that each of the first active circuit AC1 and the second active circuit AC2 includes four sides and thus four areas (quadrants) surround each of the first active circuit AC1 and the second active circuit AC2. The use of the terms "first area", "second area", "third area", "fourth area", "fifth area", "sixth area", "seven area", and "eighth area" is used in the present application for bookkeeping purposed only. It is further noted that the various areas 12, 14, 16 and 18 are in close proximity to the first active circuit AC1, while the various areas 20, 22, 24 and 26 are in close proximity to the second active circuit AC1. By 'close proximity' it is meant a distance of less than 0.5 microns from a side of each of the active circuits, AC1, AC2.

In accordance with the present application, at least one of the first area 12, the second area 14, the third area 16 and the fourth area 18 that surrounds the first active circuit AC1 includes an active circuit-containing region containing another active circuit.

In some embodiments of the present application, an active circuit-containing region is present on only one of the sides of the first active circuit AC1, and the other three sides of the first active circuit AC1, not including the active circuit-containing region, contain a dummy region. Stated in other terms, the present application contemplates an embodiment in which the active circuit-containing region is present only in one of the first area 12, the second area 14, the third area 16, and the fourth area 18, while the other of the first, second, third and fourth areas (12, 14, 16, 18), not including an active circuit-containing region, includes a dummy region. The dummy regions can be the same or different from each other.

In some embodiments of the present application, an active circuit-containing region is present on two of the sides of the first active circuit AC1, and the other two sides of the first active circuit AC1, not including the active circuit-containing region, contain a dummy region. Stated in other terms, the present application contemplates an embodiment in which the active circuit-containing region is present in two of the areas (12, 14, 16, 18), while the other two areas (12, 14, 16, 18), not including an active circuit-containing region, includes a dummy region. The dummy regions can be the same or different from each other, and the active circuit-containing regions can be the same or different from each other. In FIG. 2, and by way of an example, the first area 12 can include a first active circuit-containing region, the second area 14 can include a first dummy region, the third area 16 can include a second active circuit-containing region, and the fourth area 18 can include a second dummy region. In such an embodiment, the first active circuit-containing region can be the same as, or different from, the second active circuit containing region, and the first dummy region can be the same as, or different from, the second dummy region.

In some embodiments of the present application, an active circuit-containing region is present on three of the sides of the first active circuit AC1, and the other side of the first active circuit AC1, not including an active circuit-containing region, contains a dummy region. Stated in other terms, the present application contemplates an embodiment in which an active circuit-containing region is present in three of the areas (12, 14, 16, 18), while the area (12, 14, 16, 18), not including an active circuit-containing region, includes a dummy region. The circuit-containing regions can be the same as, or different from, each other.

In some embodiments of the present application, an active circuit-containing region is present on all four of the sides of the first active circuit AC1. Stated in other terms, the present application contemplates an embodiment in which an active circuit-containing region is present in all four of the areas (12, 14, 16, 18). The active circuit-containing regions can be the same or different from each other.

At this point of the present application and in one embodiment of the present application, the second active circuit AC2 can contain a dummy region located on each of the sides of the second active circuit AC2. Stated in other terms, a dummy region can be present in each of four areas (20, 22, 24, 26) surrounding the second active circuit AC2. In FIG. 2, and by way of an example, the fifth area 20 can include a first dummy region, the sixth area 22 can include a second dummy region, the seventh area 24 can include a third dummy region, and the eighth area 26 can include a fourth dummy region. In such an embodiment, the various dummy regions can be the same and/or different from each other. The dummy regions that surround the second active circuit AC2, can be the same or different from the dummy regions that surround the first active circuit AC1.

In some embodiments, the second active circuit AC2 can contain a dummy region located on one, two or three sides of the second active circuit AC2, while the remaining side or sides can include an active circuit-containing region. The active circuit-containing regions that can surround the second active circuit AC2 can be the same as, or different from, each other, as well as being the same as, or different from, the active circuit-containing regions that can be present around the first active circuit AC1. It is noted that in the present application, the circuit layout around the first active circuit AC1 is different from the circuit layout around the second active circuit AC2. Each of the first, second, third, fourth areas adjacent to the first active circuit AC1 and each of the fifth, sixth, seventh, and eight areas adjacent to the second active circuit AC2 have a cell size of 0.5 micron or greater up to, and including, 1000 microns.

After providing (i.e., forming) an initial structure such as is shown in FIG. 2, the first active circuit AC1 is evaluated to determine which side, or sides, of the first active circuit AC1 contains the active circuit-containing region. The evaluation of the first active circuit layout can be performed visually or by optical means. The evaluation can be aided by a computer program that can perform such an evaluation. In one example, the evaluation could find that the first area 12 and the third area 16 both contain an active circuit-containing region, while the second area 14 and the fourth area 18 both contain a dummy region.

After this evaluation, an evaluation of the second active circuit AC2 can be performed to determine the actual make-up of the areas 20, 22, 24, 26 surrounding the second active circuit AC2. The evaluation of the second active circuit layout can be performed visually or by optical means. This evaluation can also be aided by a computer program that can performed such an evaluation. In one example, the evaluation could find that all four areas 20, 22, 24, 26 that surround the second active circuit AC2 contain a dummy region.

After performing the above evaluations, areas surrounding the second active circuit AC2 that do not match the active circuit-containing region are replaced with a circuit mimic fill area. In accordance with the present application, the circuit mimic fill area that is used substantially matches the active circuit containing region that is adjacent to the first active circuit AC1. Also, the circuit mimic fill area is placed on an equivalent side of the second active circuit as the active circuit-containing region that is present adjacent the first active circuit. In one embodiment, the replacing can be performed by disconnecting the metal wiring that is present in at least one of the areas 20, 22, 24, 26 surrounding the second active circuit AC2. In one embodiment, the replacing can be performed by physically removing at least one of the areas 20, 22, 24, 26 surrounding the second active circuit AC2 and replacing that removed area with circuit mimic fill area.

In some embodiments of the present application, it may be necessary to remove the dummy region from areas 20, 22, 24, 26 and replace it with a dummy region that substantially matches the dummy areas that surround the first active circuit AC1. In such an embodiment, the replacement dummy area is formed in the equivalent area of the second active circuit AC2 as is the dummy area present around the first active circuit AC1.

Figure 3:
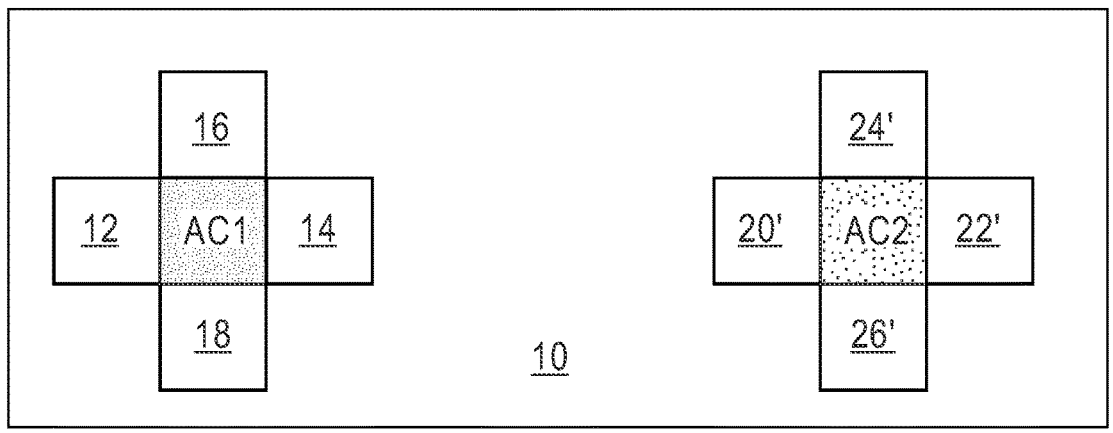
FIG. 3 is a top-down view of the exemplary initial structure shown in FIG. 2 after performing the method of the present application.

Referring now to FIG. 3, there is illustrated the exemplary initial structure shown in FIG. 2 after performing the method of the present application, i.e., evaluation and replacing. In one example, the previous fifth area 20 including a dummy region can be replaced by a circuit mimic fill area 20' that substantially matches the active circuit containing region 12 that is present in the first area 12 surrounding the first active circuit AC1, the previous eighth area 24 containing another dummy region can be with another circuit mimic fill area 24' that substantially matches the active circuit containing region 16 that is present in the third area 16 surrounding the first active circuit AC1, the previous sixth area 22 including a dummy region can be replaced by a dummy region 22' that mimics the dummy region found in the second region 14 of the first active circuit AC1, and the previous eight area 26 including a dummy region can be replaced by a dummy region 26' that mimics the dummy region found in the fourth region 18 of the first active circuit AC1. Matching all the areas surrounding the second active circuit AC2, as is the case in the exemplary embodiment shown in FIG. 3, provides best results.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A structure comprising:
 a first active circuit having an east side, a west side, a north side and a south side, wherein a first area is located adjacent to the east side of the first active circuit, a second area is located adjacent to the west side of the first active circuit, a third area is located adjacent to the north side of the first active circuit and a fourth area is located adjacent to the south side of the first active circuit, and the first area and the second area do not extend beyond a north sidewall and a south sidewall of the first active circuit, the third area and the fourth area do not extend beyond an east sidewall and a west sidewall of the first active circuit, and only one side of the first area, the second area, the third area and the fourth area is in contact with active circuitry, the active circuitry being the first active circuit, and wherein at least one of the first area, the second area, the third area and the fourth area comprises an active circuit-containing region containing another active circuit; and a second active circuit spaced apart from the first active circuit by a distance of greater than 0.5 microns and containing a device that needs matching to a device of the first active circuit, the second active circuit having an east side, a west side, a north side and a south side, wherein a fifth area is located adjacent to the east side of the second active circuit, a sixth area is located adjacent to the west side of the second active circuit, a seventh area is located adjacent to the north side of the second active circuit and an eighth area is located adjacent to the south side of the second active circuit, the fifth area and the sixth area do not extend beyond a north sidewall and a south sidewall of the second active circuitry, the seventh area and the eighth area do not extend beyond an east sidewall and a west sidewall of the second active circuitry, and only one side of the fifth area, the sixth area, the seventh area and the eighth area is in contact with an active circuitry, the active circuitry being the second active circuitry, and wherein at least one of the fifth area, the sixth area, the seventh area and the eighth area comprises a circuit mimic fill area that substantially matches the active circuit-containing region that is adjacent to the first active circuit, and wherein the circuit mimic fill area is located on an equivalent side of the second active circuit as the active circuit-containing region that is present adjacent the first active circuit and wherein the circuit mimic fill area is spaced apart from the first area, the second area and the third area of the first active circuit.

2. The structure of claim 1, wherein the circuit mimic fill area is not connected to any metal wiring.

3. The structure of claim 2, wherein the circuit mimic fill area completely matches the active circuit-containing region that is adjacent to the first active circuit.

4. The structure of claim 2, wherein the device of the second active circuit has a device parameter that needs to match an equivalent device parameter of the device of the first active circuit.

5. The structure of claim 2, wherein the active circuit-containing region is present on only one of the sides of the first active circuit, and the other three sides of the first active circuit, not including the active circuit-containing region, contain a dummy region.

6. The structure of claim 5, wherein the circuit mimic fill area is present on only one side of the second active circuit, and wherein the other three sides of the second active circuit contain a dummy region that matches the dummy regions surrounding the first active circuit.

7. The structure of claim 2, wherein the active circuit-containing region is present on two of the sides of the first active circuit, and the other two sides of the first active circuit, not including the active circuit-containing region, contain a dummy region.

8. The structure of claim 7, wherein the circuit mimic fill area is present on two sides of the second active circuit, and wherein the other two sides of the second active circuit contain a dummy region that matches the dummy regions surrounding the first active circuit.

9. The structure of claim 2, wherein the active circuit-containing region is present on three of the sides of the first active circuit, and the other side of the first active circuit, not including the active circuit-containing region, contains a dummy region.

10. The structure of claim 9, wherein the circuit mimic fill area is present on three sides of the second active circuit, and wherein the other side of the second active circuit contains a dummy region that matches the dummy region surrounding the first active circuit.

11. The structure of claim 2, wherein the active circuit-containing region is present on all four of the sides of the first active circuit, and the circuit mimic fill area is present on all four sides of the second active circuit.

12. The structure of claim 1, wherein each of the first active circuit and the second active circuit has a cell size of 0.5 micron or greater up to, and including, 1000 microns and each of the first, second, third, fourth areas adjacent to the first active circuit and each of the fifth, sixth, seventh, and eight areas adjacent to the second active circuit have a size of 0.5 micron or greater up to, and including, 1000 microns.

* * * * *